(12) United States Patent
Traer Clark (10) Patent No.: US 12,052,183 B1
(45) Date of Patent: Jul. 30, 2024

(54) RESOURCE ALLOCATION DISCOVERY AND OPTIMIZATION SERVICE

(71) Applicant: Wells Fargo Bank, N.A., San Francisco, CA (US)

(72) Inventor: Jonathon Traer Clark, New Canaan, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/184,231

(22) Filed: Mar. 15, 2023

(51) Int. Cl.
| | | |
|---|---|---|
| *H04L 12/923* | (2013.01) | |
| *G06K 9/62* | (2022.01) | |
| *H04L 12/911* | (2013.01) | |
| *H04L 12/927* | (2013.01) | |
| *H04L 41/22* | (2022.01) | |
| *H04L 47/70* | (2022.01) | |
| *H04L 47/762* | (2022.01) | |

(52) U.S. Cl.
CPC ............ *H04L 47/822* (2013.01); *H04L 41/22* (2013.01); *H04L 47/762* (2013.01)

(58) Field of Classification Search
CPC ..... H04L 47/822; H04L 41/22; H04L 47/762; H04L 47/781; H04L 47/808; G06F 18/214
See application file for complete search history.

(56) References Cited

U.S. PATENT DOCUMENTS

| | | | |
|---|---|---|---|
| 7,296,734 B2 | 11/2007 | Pliha | |
| 7,720,761 B2 | 5/2010 | Trench et al. | |
| 7,860,786 B2 | 12/2010 | Blackburn et al. | |
| 9,779,403 B2 | 10/2017 | Ranganath et al. | |
| 10,417,379 B2 | 9/2019 | Tanner, Jr. et al. | |
| 10,769,569 B2* | 9/2020 | Lucas | G06Q 10/0635 |
| 10,803,517 B2 | 10/2020 | Szollar | |
| 10,949,918 B2 | 3/2021 | Fidanza et al. | |
| 11,651,309 B2* | 5/2023 | Anderson | G06Q 10/06312 |
| | | | 705/7.22 |
| 2005/0149940 A1* | 7/2005 | Calinescu | G06F 9/5061 |
| | | | 718/104 |
| 2010/0145929 A1* | 6/2010 | Burger | G06F 16/24542 |
| | | | 707/E17.017 |
| 2011/0131130 A1 | 6/2011 | Griffin et al. | |

(Continued)

FOREIGN PATENT DOCUMENTS

WO  2016028933  2/2016

*Primary Examiner* — Abdullahi E Salad
(74) *Attorney, Agent, or Firm* — SCHWEGMAN LUNDBERG & WOESSNER, P.A.

(57) ABSTRACT

Disclosed in some examples are systems, methods, and machine-readable mediums which automatically discover and aggregate resource allocation data from different network-based resource allocation stores and present, in a GUI, a total resource allocation picture to entities. During setup, an example system may discover external resource stores used by the entity from a resource allocation clearinghouse service and/or from explicit entity input. The system may then obtain, from the discovered external resource stores (and other resource stores entered by an entity) resource allocation data of the entity. The system may infer one or more goals based upon the resource allocation data of the entity. The goals may be used, along with rules to provide resource allocation optimizations. Entity health data may also be used to offer one or more resource-related rewards.

20 Claims, 6 Drawing Sheets

(56) References Cited

U.S. PATENT DOCUMENTS

| | | |
|---|---|---|
| 2012/0109802 A1 | 5/2012 | Griffin et al. |
| 2012/0173406 A1 | 7/2012 | Fei et al. |
| 2014/0067650 A1 | 3/2014 | Gardiner et al. |
| 2015/0078262 A1* | 3/2015 | Irigi .................... H04W 72/51 370/329 |
| 2019/0311428 A1 | 10/2019 | Adjaoute |
| 2020/0294133 A1 | 9/2020 | Cella |
| 2023/0015531 A1* | 1/2023 | Karri .................... H04L 47/822 |

* cited by examiner

RESOURCE ALLOCATION DISCOVERY AND OPTIMIZATION SERVICE

TECHNICAL FIELD

Embodiments pertain to resource allocation discovery. Some embodiments relate to resource allocation goal discovery, Some further embodiments relate to resource allocation optimization. Some additional embodiments relate to resource-based rewards or penalties based upon entity health.

BACKGROUND

Entities may store resources in one or more resource stores. New advancements in technology and in network communications have made finer-grained monitoring and allocation of resources stored in these resource stores possible. For example, entities can now monitor and update resource allocations in real-time or near real-time using network-based communications tools provided by network-based resource stores. These tools also enable entities to continuously track and optimize their resource allocation strategies by changing which resources are stored in which resource stores, moving resources between stores, and the like. Resource allocation strategies may be defined as an allocation of presently available and/or future expected resources to one or more resource stores. Since some resource stores may accrue additional resources as a function of time and an amount of resources allocated to the resource store, and other factors, sub-optimal resource allocation strategies implemented now may reduce a quantity of resources available to the entity in a future time frame.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

As previously described, advancements in network technology and communications have made it possible to utilize fine-grained monitoring and control of resource allocations. Despite this level of control, each network-based resource store service may have a different interface for monitoring and changing resource allocations. Entities having multiple resource allocations with different network-based resource allocation systems (hereinafter resource store services) must interface with multiple resource store services to obtain the status of their resource allocations. Entities may even lose track of resources due to the fragmented nature of their storage of resources in multiple different resource stores.

In addition, entities may make poor decisions on resource allocation optimization due to a lack of knowledge on optimal resource allocation strategies. For example, the entity may apply sub-optimal resource allocation strategies based upon a simplistic model of resource allocations when other, more advanced models may provide more optimal results. For example, entities may apply naïve resource optimizations based upon individual resource budgeting principles when more advanced working capital methodologies may be more optimal. While existing resource allocation tools may allow you to know whether certain resource allocations meet explicitly stated resource allocation goals, they do not provide recommendations using these more sophisticated models, nor do they provide for ongoing optimization workflows. For example, existing systems do not attempt to determine what an entity is trying to achieve based upon current resource allocation positions and tactics, nor do current systems continue to track resource optimizations and update recommended optimizations based upon entity behavior.

Disclosed in some examples are systems, methods, and machine-readable mediums which automatically generate resource allocation optimizations based upon sophisticated resource allocation models. A system may provide for continual optimization of those recommendations based upon implicit and explicit entity feedback. First, during setup, the system may discover external resource stores used by the entity based upon resource store information obtained from a resource allocation clearinghouse service and/or from explicit entity input. The system may then obtain, from the discovered external resource stores (and other resource stores entered by an entity) resource allocation data of the entity. The system may then infer one or more goals based upon the resource allocation data of the entity as applied to one or more rules. The goals may be used, along with rules to provide resource allocation optimizations. In some examples, the rules used to provide resource allocation optimizations may be based upon corporate working capital management methodologies. Entities may then provide feedback on the provided goals. The feedback may then be used to further revise the rules to obtain better future predictions. If the goal is updated, the system may provide a new resource allocation optimization corresponding to the updated goal. The system may periodically monitor the resource al location behavior of the entity. If the entity does not implement the suggested optimization, the system may modify the inferred goal, or the provided optimization. Once the user implements one or more suggested optimizations, the ruleset may be modified to prioritize recommendations of the particular implemented optimizations over optimizations that were not implemented. In this way, the system may tailor the optimization suggestions to the particular entities and to optimizations that are likely to be implemented.

Working capital methodologies utilize the entire resource allocation ecosystem (rather than focusing on just resource flow) to understand how each element of the ecosystem drives the resource flow. For example, the working capital methodology may utilize a resource allocation income statement, a resource flow forecast, and a resource balance sheet.

The working capital methodologies utilize resource assets and liabilities along with various resource allocation tools to achieve short, medium, and long term entity resource allocation goals. For example, under a working capital methodology, a recommendation may be to overdraw a resource account this month and then pay off the overdrawn account next month using a high-interest resource credit account in order to achieve some long- or short-term goal. Example resource allocation tools include resource credit facilities, investment facilities, overdraft products, credit cards, and the like. Using a working capital methodology on an entity such as an individual is unique in that the problem of goal seeking may be approached less as a CPA would and more as a corporate treasurer.

Also disclosed in some examples are systems, methods, and machine-readable mediums which provide for resource-related rewards and/or penalties as a result of entity health and/or resource allocation health meeting one or more entity health-related criteria. The resource-related rewards may be, for example, a modification in resource-related loan terms, such as a lower interest rate, a reduction in fees, a direct resource transfer, or the like. In some examples, the health-related criteria may be a health score that is calculated using a number of health metrics. In some examples, the health-related criteria is an entity health trend that quantifies an entity's health over a specified time period. In addition, the system may also include criteria for resource allocation health in the decision of whether to provide a resource-related award to the entity. Thus, the system may require satisfaction of both a health-related goal and a resource allocation related goal in order to provide the reward. In some examples, if the entity has poor health and/or poor resource allocation health, a penalty may be assessed.

In some examples, resources, as used herein, may include data in a data structure, such as data indicating ownership of currency (such as cash or equivalents), credit, stocks, bonds, property, or the like. Resources may also be a debt owed or an amount of remaining credit. In some examples entities may be individual users, families, organizations, businesses, and the like. In some examples, resource stores may be data stores such as accounts, brokerage accounts, bond accounts, property portfolios, credit card accounts, mortgage accounts, loan accounts, and the like. Resource allocation data may comprise data describing resources in one or more resource stores and/or data describing resource debts owed by the entity. Adjustments of resource allocation strategies may include changes to resource allocations, such as moving resources from a first resource store to a second resource store, changing an allocation of future resources (e.g., to put more future resources in a first resource store), and the like. In these examples, the present disclosure may improve the financial health of an individual, business, or other entity. A person of ordinary skill in the art, having the benefit of the present disclosure, will recognize that the inventive techniques disclosed herein may be applied across a wide range of applications that is not limited to computing or financial optimizations. That is, the techniques disclosed herein may apply just as equally to computing resources such as processor time (e.g., for scheduling processes), and the like.

The present disclosure includes technology that solves the technical problem of determining an optimal resource allocation adjustment to achieve one or more resource optimization goals by using a technical solution of inferring goals for a user based upon past resource behavior, determining optimization strategies for those goals, and providing continual refinement of the optimization strategies in response to feedback from the entity. The use of machine-learning models and/or rules to provide the inferred goals and/or optimization strategies and the updating of those models in response to actual user behavior removes individual entity decision making and replaces it with optimization recommendations that not only achieve resource optimization strategies, but that are actually implemented by entities.

In addition, the present disclosure includes technology that solves the technical problem of multiple user interfaces and wasted networking and computing resources inherent in accessing multiple different network-based resource store services to monitor resource activity by using the technical solution of presenting a single interface to view all resource allocations across different systems. This provides for rapidly accessing and processing information and increases the efficiency of a user interface by al lowing the user to locate information of interest conveniently and rapidly. The disclosed techniques spare users of the time-consuming operations of navigating to, opening up, and then navigating within, each separate resource store's network-based interface. The disclosed techniques thus recite specific improvements to the way computers operate.

Figure 1:
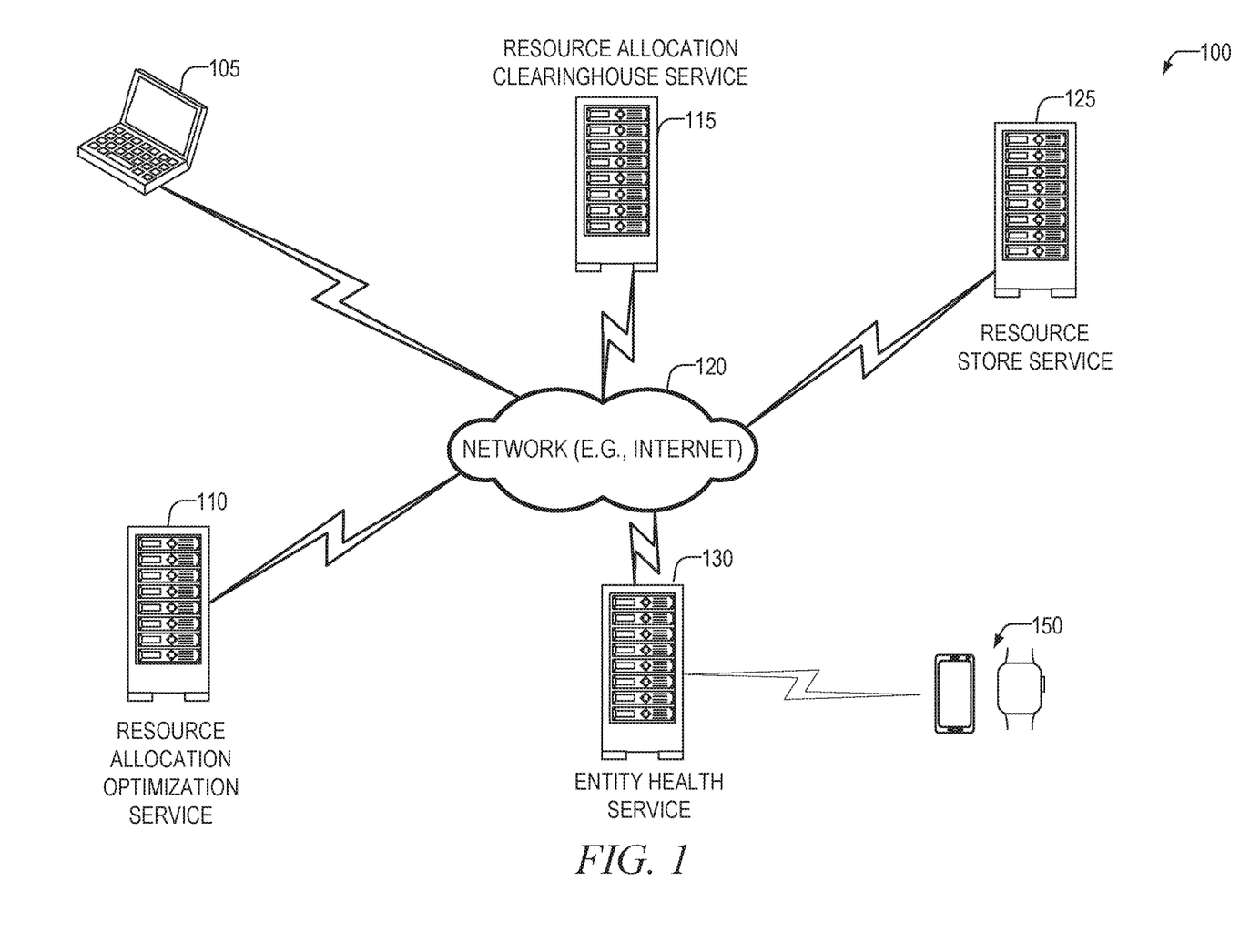
FIG. 1 illustrates a schematic of an environment for resource allocation optimization according to some examples of the present disclosure.

FIG. 1 illustrates a schematic of an environment 100 for resource allocation optimization according to some examples of the present disclosure. As can be appreciated by those of skill in the art having the benefit of the present disclosure, components shown in FIG. 1 are exemplary and one or more components shown in FIG. 1 may be combined with other components, separated into further components, additional components may be added, or some components may be removed. Components of FIG. 1, may communicate through one or more computer networks, such as network 120.

Entity computing device 105 may be a computing device in the form of a desktop, laptop, workstation, mobile phone, or the like. Entity computing device 105 may communicate with the resource allocation optimization service to setup an account, enter information about the entity, receive resource optimization recommendations, and the like through one or more Graphical User Interfaces (GUIs) provided by the resource allocation optimization service 110. Information entered by the entity computing device 105 may be entered into the one or more GUIs. GUIs may be provided by the resource allocation optimization service 110 in the form of GUI descriptors sent to the entity computing device 105.

Resource allocation optimization service 110 may periodically interface, on behalf of the user, with a resource allocation clearinghouse service 115. The resource allocation optimization service 110 may download resource allocation data about the entity. Resource allocation data may include identifiers of resource accounts, resource balances, a credit score, and the like. In some examples, the resource allocation data may only be reported to the resource allocation clearinghouse service 115 on an infrequent basis and thus may be outdated or may be otherwise incomplete. The resource allocation optimization service may utilize the resource allocation data to contact one or more resource store services (such as resource store service 125) where the resource allocation data obtained from the resource allocation clearinghouse service 115 indicates that the entity stores resources. In some examples, the resource optimization service may obtain authentication credentials with the resource store service for the entity's account. For example, by obtaining the entity's username and/or password from the entity, or otherwise obtaining permission, for example by utilizing Open Authentication (OAuth) techniques. In some examples, the use of the resource allocation clearinghouse to find accounts of the entity may take the place of lengthy onboarding form filling of the entity. In some examples, the resource allocation clearinghouse may be a credit reporting service such as Equifax, TransUnion, or the like.

Resource allocation optimization service 110 may infer one or more goals based upon the resource allocation data. For example, current resource allocation data and/or past resource allocation data (e.g., past resource allocation behaviors) may be used to infer one or more goals of the entity. For example, by analyzing savings, checking, salary information, credit history, and the like, the resource allocation optimization service 110 may deduce that the entity (e.g., an individual or family) is saving for a house. The goal may be deduced from the resource behavior of the user as evidenced by the resource allocation data and a set of one or more rules. Rules may be if-then statements that utilize resource allocation information, such as resource account balances, projected resource income, resource debts, and the like. Based upon the goals, the resource allocation data, and the rules, the resource allocation optimization service 110 may create one or more resource optimization suggestions that may be provided to the entity computing device 105, e.g., in a GUI. Example optimization suggestions may be to pay off revolving debt accounts, such as credit card accounts at the last day (e.g., to maximize interest if the resources were from an interest-bearing account), providing a recommendation to refinance a resource debt obligation, and the like.

The entity may, through the computing device 105, provide feedback to the resource allocation optimization service 110 that indicates that the goal is correct or not correct. In examples in which the goal is identified as correct, the resource allocation data of the entity may be used as positive training data by the resource allocation optimization service 110 to further optimize the rules and/or machine learning model. In examples in which the goal is incorrect, the resource allocation optimization service 110 may, using the rules and/or machine learning model, generate one or more correction possibilities. For example, the resource optimization may initially be focused upon the conservation of resources and thus may suggest optimizations such as paying resource debts at the last possible time; however, the entity may indicate that increasing a resource allocation management score (e.g., a credit score) is the entity's goal—e.g., to save for the purchase of a large resource (such as a car, house, boat) and thus paying early may increase that score and be more important. In these examples, the actual goal may be used as feedback to the rules and/or models and may be used to generate a new goal and new optimizations. The resource allocation optimization service 110 may continually monitor the resource allocation data of the entity to monitor progress toward goals and to continually suggest additional optimizations.

Resource allocation optimization service 110 may also contact entity health service 130 to obtain entity health metrics. The entity health metrics may be utilized along with one or more rules to provide resource-related rewards and/or penalties based upon the health metrics. In some examples, the health metrics may be a health score that quantifies a perceived health of the entity using one or more formulae applied to other health metrics. In other examples, the health metrics may be a financial or medical health metric of an individual. The health score may be calculated based upon health metrics, such as biological data such as heart-rate, body mass index, weight, muscle mass, smoking status, exercise data (how much a person exercises and what they do), cholesterol levels, family histories, genetic histories and data, salary history, employment history, mental health information, and the like. Health metrics for other entity types such as a business may be evidenced by profits, losses, revenue, employee turnover, years in business; health metrics of key employees, and the like. By utilizing a health score instead of individual health metrics, an entity's privacy may be protected. In some examples, the use and/or collection of health metrics may be controlled by the entity using one or more privacy settings.

In some examples, the entity health service 130 may be part of resource allocation optimization service 110. In some examples, the entity health service 130 may obtain one or more health metrics of the entity using sensors that may be wearable (for example, from wearable devices 150). The wearable devices 150 may upload health metrics to the entity health service 130, which may calculate a health score from the metrics. The health metrics used in calculating the health score may be an average or a calculation over time. For example, if a health metric used is a blood pressure or heart rate, the metric may use an average blood pressure or heart rate over a period of time (e.g., days, weeks, or months), Other example devices that entity health service 130 may interface with to determine an entity health may include exercise machines such as a network-connected stationary cycle, rowing machine, treadmill, or the like. Other health score sources may include doctor's offices (with permission of the entity) where health conditions, lab tests, and other data may be utilized.

In some examples, the system may utilize one or more rules to develop one or more health-related goals for the entity in the same way as the system utilizes resource allocation data for developing resource-related goals for the entity, Rules may include one or more model data structures. Achievement, or non-achievement of these health-related goals may then be monitored by the entity health service 130 using data from wearable devices 150, connected exercise machines, doctor data, and the like. By achieving the health-related goal, one or more resource-based rewards may be provided. For example, a reduction in an interest rate of a loan, reduced fees, refunding of fees, or the like. In some examples, once a goal is achieved, another goal may be presented and tracked.

As noted, the resource allocation optimization service 110 may provide one or more resource-based rewards or penalties based upon the health metrics. For example, by adjusting one or more resource obligation terms and conditions based upon the health metrics (such as the health score) meeting one or more prespecified criteria. Example adjustments may include lowering, or causing to be lowered, an interest rate on a loan not yet granted or an interest rate on an already granted loan of the entity. In some examples, the interest rate may be raised or other resource penalties may be enforced if the health metrics indicates poor health. In some examples, the maximum interest rate may be the rate contractually agreed by the entity when taking out the loan and thus an increase is not possible. In other examples, the interest rate may be variable and one component of the variability may be the health score. The entity's health metrics may be periodically monitored and the rewards or penalties adjusted or modified based upon changes in the health metrics. For example, if in year 1 of the loan, the entity's health is good (e.g., above a threshold percentage), the system may reduce an interest rate of a loan taken by the entity 0.25%. If in year 2, the health score worsens, the interest rate may be raised.

In still other examples, the resource-based rewards may be tied to both resource al locations and health of the entity. For example, one or more resource reward criteria may be specified for providing the resource-based reward. The criteria may specify that the entity achieve one or more resource-based goals (e.g., a minimum credit score, an amount of money in savings, and the like) and one or more health goals (e.g., achieving a particular health score). In some examples, the resource-based goals may be or be based upon the resource-based goals suggested by the resource allocation optimization service.

Figure 2:
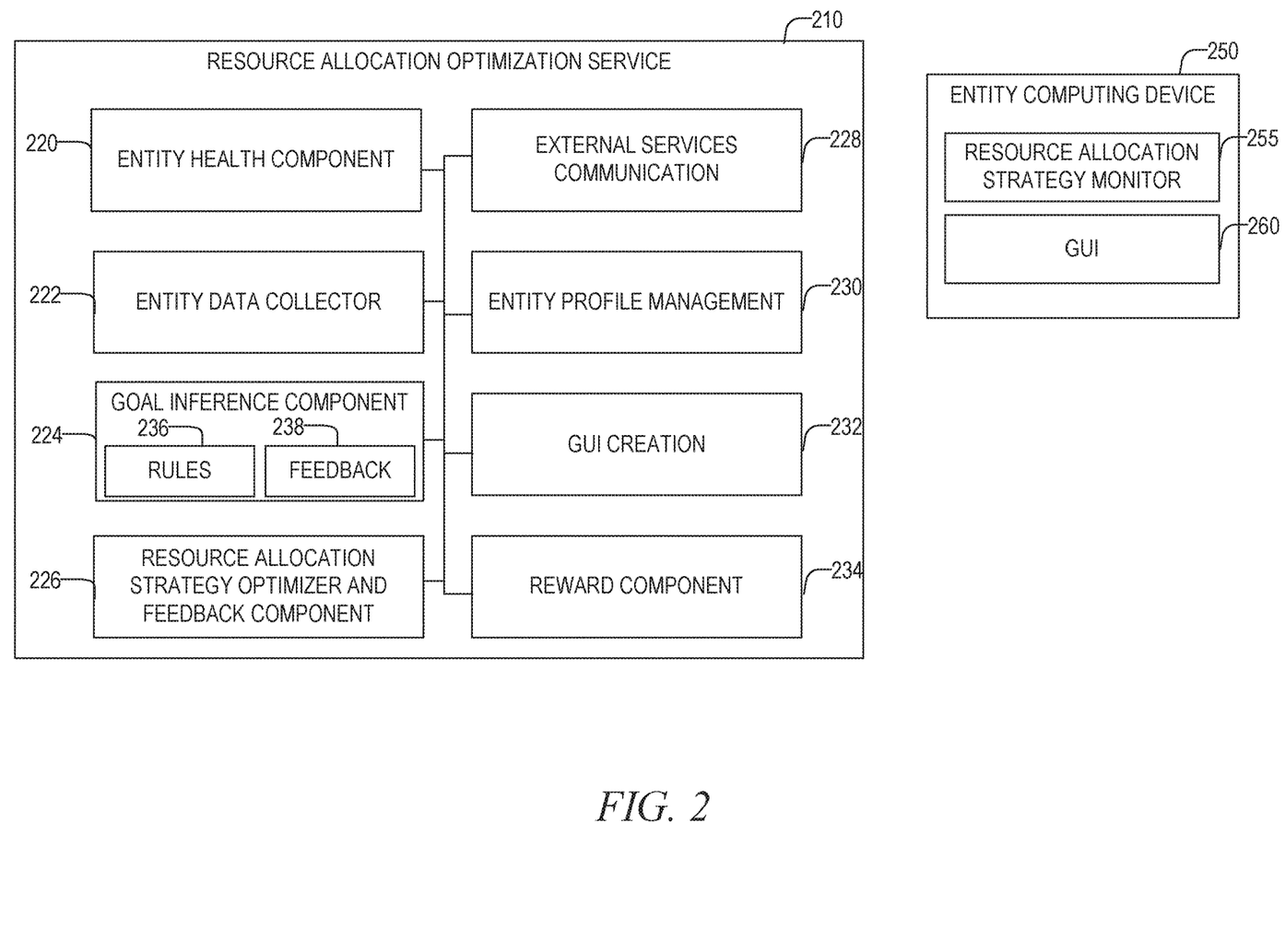
FIG. 2 illustrates a resource allocation optimization service according to some examples of the present disclosure.

FIG. 2 illustrates a resource allocation optimization service 210 according to some examples of the present disclosure. In some examples, resource allocation optimization service 210 is an example of resource allocation optimization service 110. The resource allocation optimization service 210 is exemplary and one of ordinary skill in the art with the benefit of the present disclosure will appreciate that the functions of one or more of the components shown in FIG. 2 may be combined or split into separate components. In addition, while shown as being on a same system, the components may be physically implemented on one or more devices, that may be communicatively coupled by either a local or remote connection. Components of the resource allocation optimization service 210 may be implemented in hardware by special purpose circuitry or through software configuring general purpose hardware processors.

Entity profile management component 230 may allow entities to create accounts with the resource allocation optimization service. This may be facilitated through GUIs produced by the GUI creation component 232, an Application Programming Interface, or another interface to the resource allocation optimization service 210. The account creation operations includes creation of one or more data structures tracking data on the entity. This data may include resource allocation data, entity demographic data, entity authorization and access data for the resource allocation optimization service 210, authorization and access data for resource stores, or the like. This data may be directly obtained from the entity, a resource allocation clearinghouse, or a resource store service, An entity may authorize the resource allocation optimization service 210 to access the entity's accounts on these services. The authorization may generate one or more authentication and/or authorization tokens that are used by the external services communication component 228 in Application Programming Interface (API) calls to access data about the entity from those external services. An example external service is an external resource data store. In other examples, the user provides a username and password for these services that are then used by the external services communication component 228. Other data tracked that may be entered by the entity may include entity data, resource information, resource-goal information, and the like.

Entity data collector component 222 may utilize the data about the entity obtained by the entity profile management component 230 to determine entity description data such as demographic information, resource allocation data, disbursement data, and the like. This data may be obtained directly from the entity's profile created and managed by the entity profile management component 230, through interfacing with the resource allocation clearinghouse, or indirectly by contacting other databases, data services and the like listed as having entity description data in the entity profile. As noted, the entity data collector component 222 may utilize the external services communication component 228 to obtain data and information about the entity from external services such as the resource allocation clearinghouse. For example, the external services communication component 228 may utilize an API to communicate with one or more external services. Data collected about the entity from these services may be stored in the entity's profile by entity data collector component 222 and entity profile management component 230.

Entity health component 220 may interface, via the external services communication component 228, with a health service. The health service may provide health metrics, such as a health score, that corresponds to or indicates a health of the entity. The health score may be a score indicative of a health at a particular point in time of the entity, a trend in the health of the entity, or the like. The entity health component 220 may work with the entity profile management component 230 to obtain permission of the entity to access the entity health metrics. The reward component 234 may offer one or more resource-related rewards, such as offering enhanced terms of a resource debt (e.g., a loan) dependance on the health metrics (such as the health score). For example, if the health score is above a threshold, a lower interest rate or other resource-based reward may be offered. In some examples, multiple thresholds may be used with multiple different rewards. For example, a health score within a first score range may yield a first reward, a health score falling within a second score range may yield a second reward, and so on. In some examples, the better the health score, the higher the reward. In some examples, the contracted-for interest rate may be a floor—e.g., the highest rate that the entity may pay such that any discount based upon the health rating may only lower the entity's rate. In other examples, the entity's rate may be increased above the initial rate based upon the entity health score based upon an agreement with the entity at the time that the loan was signed. The reward component 234 may interface with one or more resource stores and/or external systems to disburse the reward. In some examples, rather than interface with an entity health service, the resource al location optimization service 110 may interface directly with other health data stores and/or sensors, such as wearables 150.

Goal inference component 224 may produce one or more analysis of the resource allocation data of a particular entity. Goal inference component 224 may include a rules component 236 and a feedback component 238. As noted, inferring a goal for an entity may be done using one or more rule-based methods using rules component 236 or based upon machine-learning models that look at current resource allocations and/or past entity resource allocation behaviors. In some examples, the machine-learning models may incorporate multi-dimensional modeling. In other examples, the rules component 236 may be a machine-learned model represented by a data structure. Feedback component 238 may receive, through a GUI provided by the resource allocation optimization service 210, feedback on the inferred goal. The feedback component may regenerate an inferred goal based upon the feedback and may update the rules and/or models based upon the feedback. The rules and/or model of rules component 236 may be based upon corporate working capital management methodologies.

Resource allocation strategy optimizer and feedback component 226 may utilize one or more of: resource optimization goals, resource allocation data, and entity demographic data to produce one or more resource allocation optimizations that would move the entity closer to reaching the resource optimization goal. For example, an individual may wish to have $X saved for retirement in Y years. The system may provide one or more recommendations for achieving this goal. The recommendations may be automatically implemented, implemented after entity confirmation, and the like Recommendations may be made using one or more rules, machine-learning algorithms, and the like. The resource allocation strategy optimizer and feedback component 226 may utilize a same set of rules or model as rules component 236, or a different set of rules or model. In some examples, the resource allocation strategy optimizer and feedback component 226 may recommend that an entity not allocate resources in one or more resource accounts. For example, the resource allocation strategy optimizer and feedback component 226 may recommend that an entity not invest in treasury bills when interest rates are expected to climb in the future (which may diminish the price of the asset).

Resource allocation strategy optimizer and feedback component 226 may also monitor the entity to determine if the entity implemented the recommended optimization. If the entity did implement the optimization, the rules or model used may have the connection between the input data and the output recommendation strengthened to increase a likelihood that similar circumstances for other entities produce the same recommendation. If the entity did not implement the optimization, the rules or model may have the connection between the input data and the output recommendation weakened to decrease that likelihood. The feedback aspects may also regenerate a different optimization and present the updated optimization to the entity. The feedback aspects may continuously update the optimization because of changing resource allocation data of the entity, changing goals, and/or implementation (or non-implementation) of recommended strategies.

GUI creation component 232 may compose one or more GUIs of the resource allocation optimization service 210. The GUI creation component 232 may create one or more GUI descriptors that may be sent to an entity's computing device where it is rendered to produce the GUI. GUI descriptors may be one or more data structures or files that, when interpreted by an application, instruct the application to render a GUI. Example GUI descriptors include Hypertext Markup Language (HTML) files, extensible Markup Language (XML) files, script files, JavaScript files, Java files, Cascading Style Sheets (CSS), information for display in a specified GUI, and the like. Applications may include a browser or a dedicated application. The dedicated application may have portions of the GUI already specified in the instructions of the application that may be supplemented by information in the GUI descriptors sent by the GUI creation component 232.

The created GUIs may present resource allocation data from one or more resource stores. For example, the GUI creation component 232 may create a dashboard that shows the resource management data of an entity, or portions thereof (such as balances of each account). This dashboard may provide a single view of the resource allocations of an entity across multiple systems. The dashboard may also include optimization recommendations as well as modeling tools to allow entities to compare projected future resource states of the entity given various input parameters.

The GUI created by the GUI creation component 232 may also allow entities to reallocate resources, e.g., such as a reallocation consistent with the optimized strategy determined by the resource allocation strategy optimizer and feedback component 226. For example, by clicking or selecting a single option, one or more resources may be re-allocated. This may be done across computing systems—such that a transfer of resources is facilitated. For example, the external services communication component 228 may contact a first service (e.g., a first resource store service) to transfer resources to a second service (e.g., a second resource store service). In some examples another service, such as a transfer service (which may be implemented on or as part of the resource allocation optimization service 210) may be used to facilitate the transfer. For example, a resource transfer service such as Automated Clearing House, Wire Transfer, and the like.

In some examples, the resource allocation optimization service 210 may also provide, for execution on an entity computing device 250, a resource allocation strategy monitor 255. The resource allocation strategy monitor 255 may, with permission of the entity, scan activity on the entity computing device 250 and determine resource allocation behaviors that deviate from the resource optimization goals. For example, an entity may be about to transfer resources to a sub-optimal resource allocation account. The resource allocation strategy monitor 255 may utilize GUI 260 to warn the user. In some examples, resource allocation strategy monitor 255 may determine a website an entity is visiting and may cross reference the URL of the site to a database of known resource allocation account sites. The database may indicate whether the site is legitimate, properly regulated, or meets specified investment criteria. In some examples, the resource allocation strategy monitor 255 may notify the user via the GUI 260 if the site is not in the database (and therefore may be illegitimate), is not a legitimate site (e.g., is a phishing site, a typo squatting site, or the like), is not properly regulated, or does not meet the specified criteria. In some examples, if the site is in the database, is legitimate, is properly regulated, and does meet specified criteria, the GUI may notify the user as well.

Figure 3:
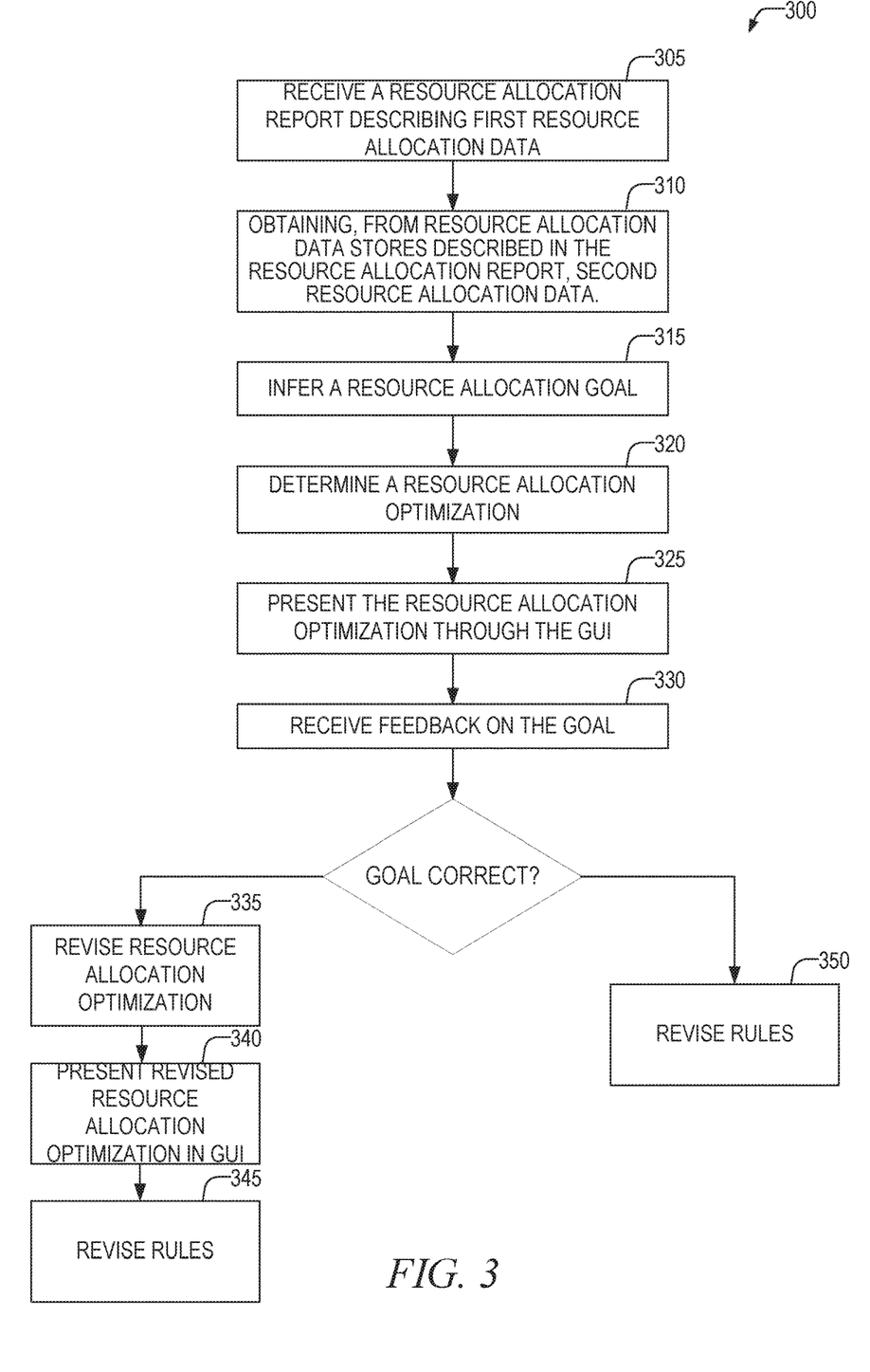
FIG. 3 illustrates a flowchart of a method of providing a resource allocation optimization service according to some examples of the present disclosure.

FIG. 3 illustrates a flowchart of a method 300 of providing a resource allocation optimization service according to some examples of the present disclosure. The operations of FIG. 3 may be performed by the resource allocation optimization service 210 according to some examples. At operation 305 the system may receive, over a network, from a resource allocation clearinghouse, a resource allocation report describing first resource allocation data of an entity, which may include an identification of a plurality of resource allocation data stores where the entity is storing resources. For example, the system may request the report from the resource allocation clearinghouse using one or more APIs and receive the report using the APIs. The report may comprise an identification of a plurality of resource stores. The identified resource stores may map to one or more known resource stores for which APIs are known and programmed into the resource allocation optimization service. The mapping may be done using a table mapping an account text string to an API component. This mapping may be stored with the user profile of the user and may be used to select the correct API component to use to obtain data.

In addition to identification of various resource stores, the resource allocation report may also include balances of those stores, resource payment history, and a resource allocation score that quantifies a score of how well an entity manages and uses resources. Example resource allocation clearinghouses may include credit reporting agencies. An example resource allocation report may be a credit report.

At operation 310, the system may obtain from the plurality of resource allocation data stores identified in the resource allocation report, second resource allocation data of the first entity. That is, the system may utilize the information from the resource allocation report to determine resource store locations of an entity. In some examples, this frees entities from having to remember every resource store they have resources stored at. In addition to resource stores identified by the resource allocation report, the resource stores accessed may be provided by the entity. The resource allocation data may include resource allocation history showing resource deposits and withdrawals over time.

At operation 315, the system may infer, from the first and second resource allocation data of the first entity and a set of rules, a resource allocation goal. For example, the entity's resource allocation history and current resource al locations may be used as input to one or more rules in a ruleset. In addition, entity demographic information may also be used as input to the rules. In other examples, the demographic information may be used to select a subset of rules within the set. For example, the selected subset may correspond with a type of entity, an age of the entity, a geographical region of the entity, or the like.

At operation 320, the system may determine a resource allocation optimization to reallocate current resource allocations of the entity to achieve the resource allocation goal (e.g., now or in the future), the resource allocation optimization determined using the first and second resource allocation data of the first entity, the resource allocation goal, and the set of rules. For example, if the entity's goal is to save for college, the system may recommend transferring resources to a college savings plan. The optimization may be a one-time optimization or a periodic optimization—such as transferring money to a savings account periodically (e.g., monthly, quarterly, yearly).

At operation 325, the system may present the resource allocation optimization through a Graphical User Interface (GUI), the GUI including portions of the first and second resource allocation data from the plurality of resource allocation data stores. For example, the system may provide one or more GUI descriptors with the portions of the resource allocation data and/or the resource allocation optimization. In addition, the GUI descriptors may provide for one or more modeling tools that allow an entity to model one or more scenarios such as increasing savings and the effect that will have on resource levels in the future.

At operation 330, the system may receive feedback from the entity through the GUI that the resource allocation goal is incorrect. For example, the entity may select one or more buttons or controls of the GUI. If the goal is not correct, then the system may receive an updated goal from the entity. For example, the system may provide one or more updated suggested goals to the entity based upon the entity's response and the entity may choose an updated goal. The updated goals may be provided based upon the ruleset, goals of similar entities, and the like. On the other hand, if the goal is correct, then at operation 350, the system may revise the ruleset to strengthen the connection between the goal and the data used to produce that goal (e.g., resource allocation data similar to the entity).

At operation 335, the system may revise the resource allocation optimization using the first and second resource allocation data of the first entity, the set of rules, and the updated goal. At operation 340, the system may present the revised resource allocation optimization through the GUI. At operation 345, the system may update the set of rules based upon the first and second resource allocation data of the first entity, the resource allocation goal, and the revised resource allocation goal.

A single ruleset may be used to determine the goals and to provide the resource allocation optimizations but in other examples, multiple rules may be used (e.g., one for determining goals, another for determining optimizations, or the like). Rules may be in the form of if-then-else statements, decision trees, models, or the like. In some examples, machine-learning models may be used and the revision of the rules may be retraining of the model using the feedback information provided by the entity.

In some examples, the method of FIG. 3 may be repeated periodically or as resource allocation of an entity changes. In some examples, the system may determine that the entity has not implemented the recommended resource allocation optimization. In these examples, the system may provide another resource allocation optimization (e.g., using the resource allocation data; rules or model; and the like). This re-recommendation may be repeated until the system determines that the entity has implemented one of the proposed suggestions. The system may then modify the rules and/or model used to favor recommended optimizations that entities actual implement. For example, if the resource allocation data suggests a set of possible resource allocation optimizations, the system may favor or prioritize the resource allocation optimizations that have been actually implemented by the entity or by other entities.

Figure 4:
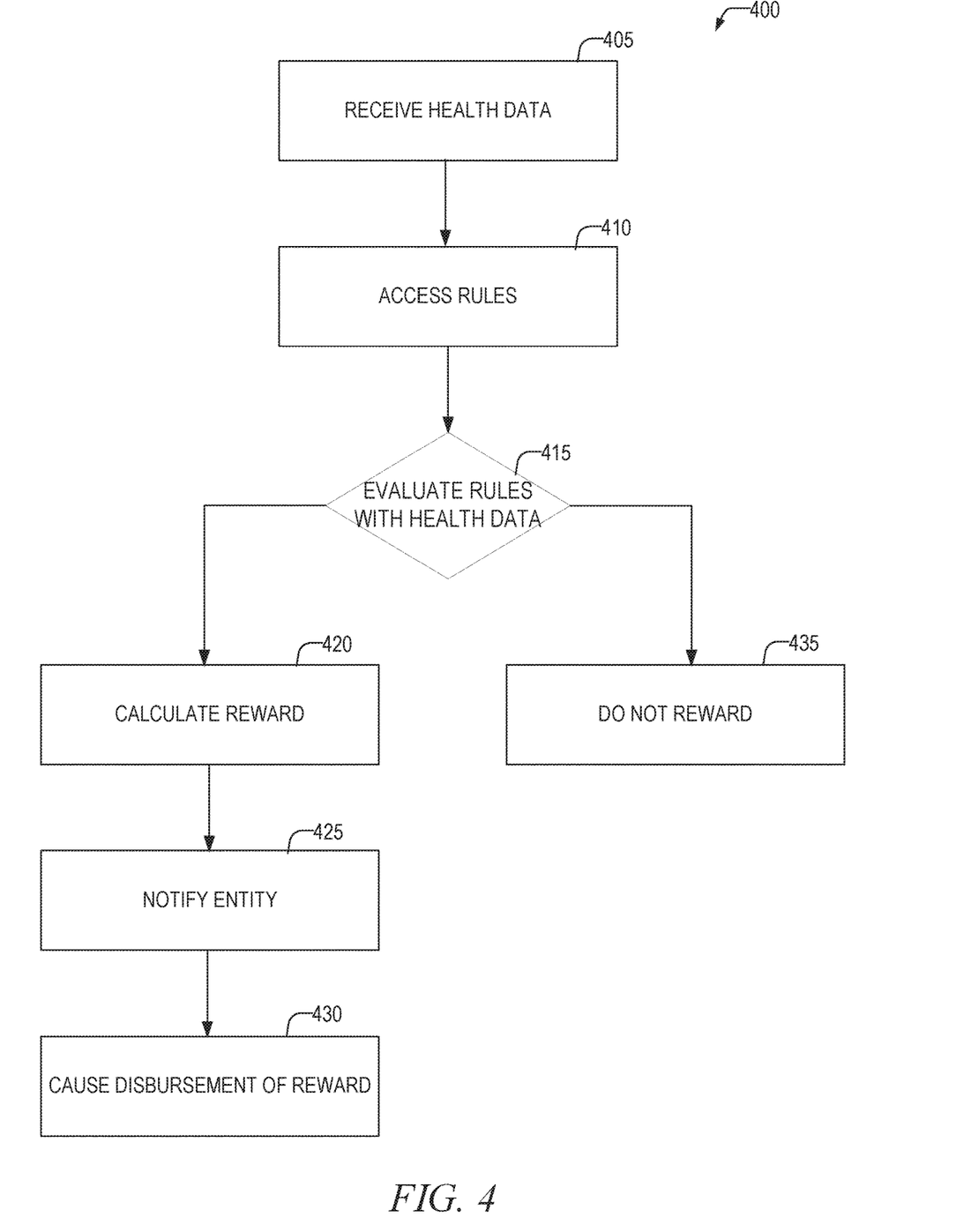
FIG. 4 illustrates a flowchart of a method of providing a reward for achieving a specified health metric such as a health score according to some examples of the present disclosure.

FIG. 4 illustrates a flowchart of a method 400 of providing a reward for achieving a specified health metric such as a health score according to some examples of the present disclosure. At operation 405 the system may request, and receive, health metrics of an entity. Health metrics may include a health score that may quantify one or more other health metrics. Health metrics may be physical indicators of the health of an entity. If the entity is an individual, the metrics may include heart rate, cholesterol levels, blood pressure, and the like. Other metrics may include health history, disease indicators, mental health indicators, and the like. Health metrics may also include job status, job history, age, income, debt, and the like. Health metrics for entities such as businesses may include number of years in business, health information of key employees or leaders, profits, losses, market cap, liabilities, accounts payable, accounts receivable, and the like.

At operation 410, the system may access one or more rules. The rules may be global for all entities, or may be specific to an entity, a resource loan, or the like. In some examples, the rules may correspond to a health and wellness goal selected by the entity or by the system. At operation 415, the rules are evaluated to determine whether to provide a reward to an entity. For example, if the health indicators are above a threshold health indicator (e.g., indicating good health), a reward may be given. If the rules, when evaluated using the health metrics, do not indicate good health, then a decision may be made at operation 435 to not reward the entity. In some examples, if the health metrics indicate poor health, then a decision may be made to penalize the entity. In these examples, a higher interest rate, additional fees, or the like may be assessed.

If a decision is made to reward the entity, then at operation 420, the system may calculate the reward for the entity. For example, by using the rules from operation 410, or different rules or one or more formulae. In some examples, a reward may be a decreased interest rate, a resource transfer to an account of the entity, a fee reduction, an increased credit limit, or the like. At operation 425, the system may notify the entity, e.g., through a graphical user interface. At operation 430, the system may cause the disbursement of the reward. For example, by causing the transference of resources, updating one or more data structures, or instructing another system to do so.

FIG. 4 illustrated the application of rewards for health data satisfying one or more rules. In other examples, the method 400 may be applied to resource allocation information meeting one or more specified objectives. For example, if the entity meets one or more resource allocation goals, a reward may be provided. In still other examples, FIG. 4 may evaluate both health data and resource allocation information. In these examples, the entity may have to satisfy one or more rules related to health data and one or more rules related to resource allocation information to receive a reward. In some examples, rewards may be allocated for allocating resources to one or more other entities—such as partner entities of the resource allocation optimization service.

Figure 5:
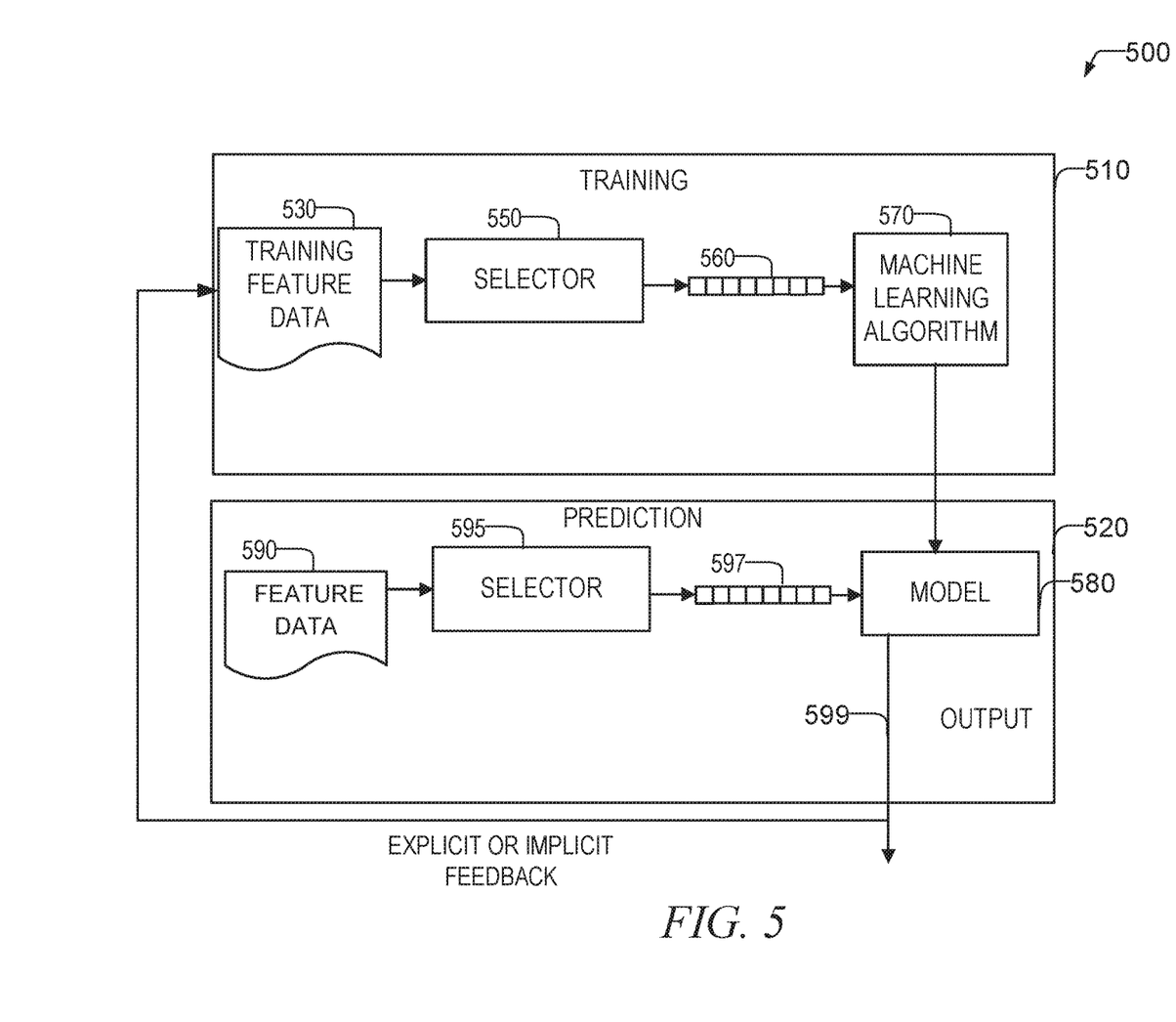
FIG. 5 shows an example machine learning component according to some examples of the present disclosure.

As previously noted, the system may utilize one or more machine-learning algorithms, for example, to predict goals based upon resource allocation data, present actionable resource allocation optimizations, and to update goals based upon feedback. FIG. 5 shows an example machine learning component 500 according to some examples of the present disclosure. The machine learning component 500 may be implemented in whole or in part by one or more computing devices. In some examples, the training component 510 may be implemented by a different device than the prediction component 520. In these examples, the model 580 may be created on a first machine and then sent to a second machine. For example, one or more portions of the machine learning component 500 may be implemented by the resource allocation optimization service 210.

Machine learning component 500 utilizes a training component 510 and a prediction component 520. Training component 510 inputs training feature data 530 into selector component 550. The training feature data 530 may include one or more sets of training data. The training feature data 530 may be labeled with the desired output. In other examples, the training data may, not be labeled, and the model may be trained using unsupervised methods and/or feedback data—such as through a reinforcement learning method. The feedback data may be a measure of error between a desired result of the algorithm and the actual result.

Selector component 550 converts and/or selects training vector 560 from the training feature data 530. For example, the selector component 550 may filter, select, transform, process, or otherwise convert the training data. For example, the selector component 550 may apply one or more feature selection algorithms to find features in the training data. The selected data may fill training vector 560 and comprises a set of the training data that is determined to be predictive of a result. Information chosen for inclusion in the training vector 560 may be all the training feature data 530 or in some examples, may be a subset of all the training feature data 530. Selector component 550 may also convert or otherwise process the training feature data 530 such as normalization, encoding, and the like. The training vector 560 may be utilized (along with any applicable labels) by the machine learning algorithm 570 to produce a model 580. In some examples, other data structures other than vectors may be used. The machine learning algorithm 570 may learn one or more layers of a model. Example layers may include convolutional layers, dropout layers, pooling/up sampling layers, Soft Max layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected.

In the prediction component 520, feature data 590 is input to the selector component 595. Selector component 595 may operate the same, or differently than selector component 550. In some examples, selector components 550 and 595 are the same components or different instances of the same component. Selector component 595 produces vector 597, which is input into the model 580 to produce an output 599, For example, the weightings and/or network structure learned by the training component 510 may be executed on the vector 597 by applying vector 597 to a first layer of the model 580 to produce inputs to a second layer of the model 580, and so on until the encoding is output. As previously noted, other data structures may be used other than a vector (e.g., a matrix).

The training component 510 may operate in an offline manner to train the model 580. The prediction component 520, however, may be designed to operate in an online manner. It should be noted that the model 580 may be periodically updated via additional training and/or user feedback. For example, additional training feature data 530 may be collected as users provide feedback on the performance of the predictions.

The machine learning algorithm 570 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic interaction Detector (CHAID), and the like), random forests, linear classifiers, quadratic classifiers, k-nearest neighbor, k-means, linear regression, logistic regression, a region based CNN, a full CNN (for semantic segmentation), a mask R-CNN algorithm for instance segmentation, Latent Dirichlet Algorithm (LDA), and hidden Markov models. Examples of unsupervised learning algorithms include expectation-maximization algorithms, vector quantization, and information bottleneck method.

As noted, the machine learning component 500 may predict resource optimization goals of an entity. In these examples, the training feature data 530 and feature data 590 may include entity description data, entity resource allocation data (including resource debt information and historical data), entity resource disbursement data, and the like. In some examples, the training feature data may be entity description data, resource allocation data, disbursement data labelled with short, medium, and/or long term resource optimization goals of that entity as input by that entity. For example, the system may have entities explicitly enter their goals initially to train a model that is then used for later determining the goals of the system. The output 599 may be short-, medium-, or long-term resource allocation goals of an entity.

In addition, the machine learning component 500 may identify resource allocation optimizations. That is, the output may be information regarding ways to optimize the entity's resource allocations. In these examples, the training and feature data 530, 590 may be one or more of entity description data, entity resource allocation data (including resource debt information), entity resource disbursement data, resource optimization goals, or the like. The output 599 may be one or more resource allocation optimizations. Example machine-learning algorithms may include genetic algorithms (where the fitness of a particular solution is evaluated using the goals), Monte Carlo simulations (which may utilize random adjustments to resources and run various financial simulation algorithms to predict results), stochastic programing, and the like. In some examples, the training data may be labelled with whether a particular entity's data in the training set illustrates good resource optimization or bad resource optimization (e.g., labelled using a manual review). In some examples, resource optimization experts may manually label training data sets with recommended optimizations for training.

The model 580 may be optimized and/or updated based upon explicit or implicit feedback. For example, an entity may indicate that a goal is not applicable to their circumstances. This feedback may then be used to refine the model 580 through the training component 510. The training component 510 may utilize the feature data 590 of the entity labeled with either a negative signal on the output goal 599, or with a signal showing the actual goal as entered by the entity. In other examples, implicit feedback may be utilized. For example, if the output 599 is a resource optimization, and the entity did not implement the resource optimization, then the implicit feedback is that the resource optimization is not desirable. This may then be used, along with the feature data initial input to cause the resource optimization suggestion, along with a label not to use that resource optimization. The prediction component 520 may be re-run on the update model and updated feature data 590 to produce another output 599 recommendation.

Figure 6:
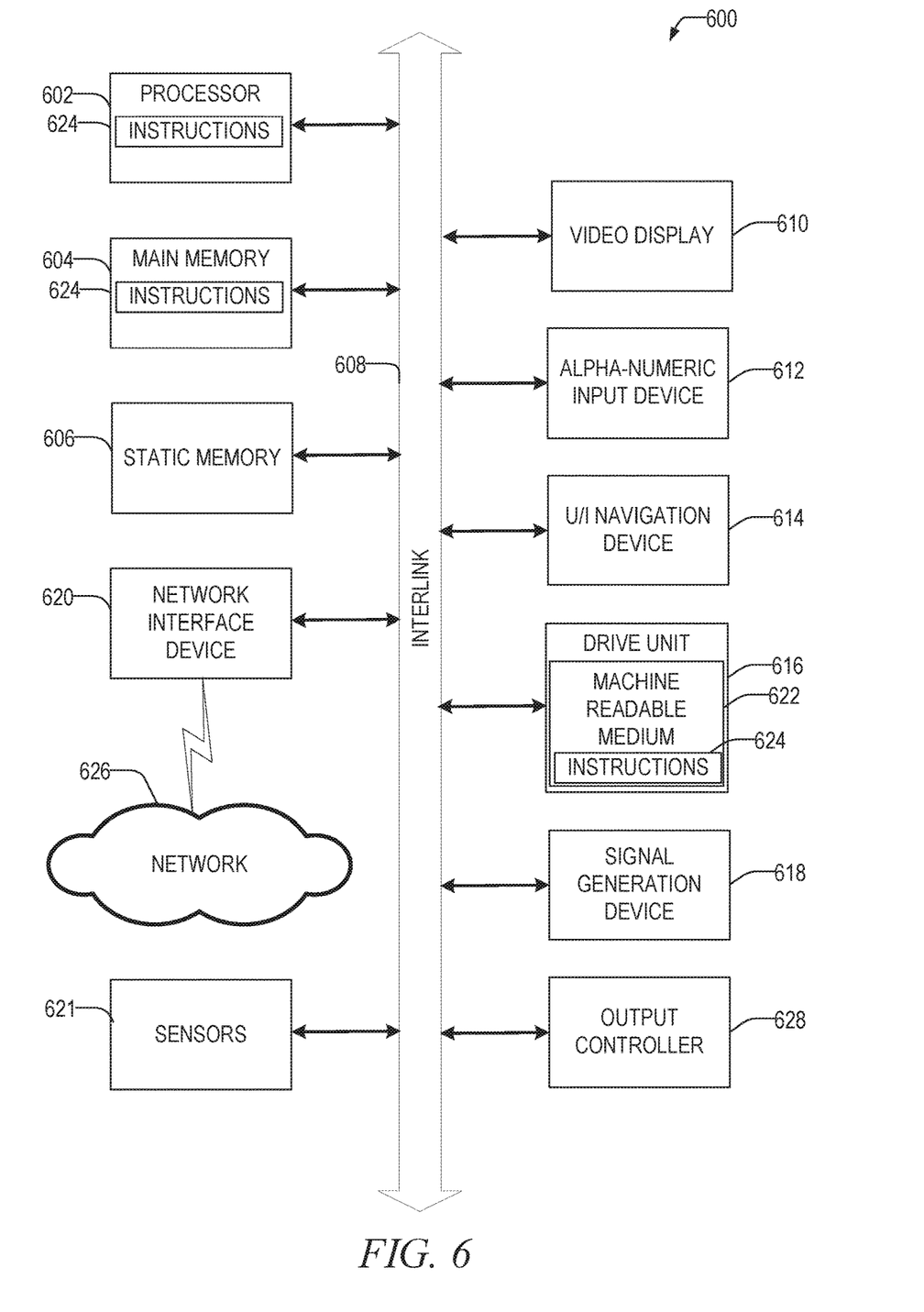
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 600 may implement or be configured by software to implement one or more of the computing devices or services of FIG. 1; the components of FIG. 2; the methods of Ms. 3 and 4; and the machine-learning modules of FIG. 5.

Examples, as described herein, may include, or may operate on one or more logic units, components, or mechanisms ("components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 600 may include one or more hardware processors, such as processor 602. Processor 602 may be a central processing unit (CPU), a graphics processing unit (GPU), a hardware processor core, or any combination thereof. Machine 600 may include a main memory 604 and a static memory 606, some or all of which may communicate with each other via an interlink (e.g., bus) 608. Examples of main memory 604 may include Synchronous Dynamic Random-Access Memory (SDRAM), such as Double Data Rate memory, such as DDR4 or DDR5. Interlink 608 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and MID-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620. The Machine 600 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

As used herein, a network-based service comprises one or more computing devices that provide services over a network, such as a packet-based network. The network-based services are provided to computing devices using one or more APIs.

OTHER NOTES AND EXAMPLES

Example 1 is a method for resource allocation optimization, the method comprising: using one or more hardware processors of a network-based service: receiving, over a network, from a resource allocation clearinghouse, a resource allocation report describing first resource allocation data of an entity and a plurality of resource allocation data stores where the entity is storing resources; obtaining, from the plurality of resource allocation data stores in the resource allocation report, second resource allocation data of the entity; inferring, from the first and second resource allocation data of the entity and a set of rules, a resource allocation goal; determining a resource allocation optimization to achieve the resource allocation goal, the resource allocation optimization determined using the first and second resource allocation data of the entity, the resource allocation goal, and the set of rules; presenting the resource allocation optimization through a Graphical User Interface (GUI), the GUI including portions of the first and second resource allocation data from the plurality of resource allocation data stores; receiving feedback from the entity through the GUI that the resource allocation goal is incorrect; receiving an updated goal from the entity; revising the resource allocation optimization using the first and second resource allocation data of the entity, set of rules, and the updated goal; presenting the revised resource allocation optimization through the GUI; and updating the set of rules based upon the first and second resource allocation data of the entity, the resource allocation goal, and the revised resource allocation goal.

In Example 2, the subject matter of Example 1 includes, receiving health score data of the entity; identifying that the health score data of the entity meets a specified criterion; and responsive to identifying that the health score data of the entity meets the specified criterion, changing a term of a resource allocation loan.

In Example 3, the subject matter of Example 2 includes, wherein changing the term of the resource allocation loan comprises reducing a resource charge for the resource allocation loan.

In Example 4, the subject matter of Examples 2-3 includes, wherein the health score data is a trend over a prespecified period of time.

In Example 5; the subject matter of Examples 1-4 includes, wherein the resource allocation goal comprises a short term, medium term, and long term goal.

In Example 6, the subject matter of Examples 1-5 includes, identifying that the entity did not implement the resource allocation optimization; responsive to identifying that the entity did not implement the resource allocation optimization, further revising the resource allocation optimization using the first and second resource allocation data of the entity, the set of rules, and the updated goal; and presenting the further revised resource allocation optimization in the GUI.

In Example 7, the subject matter of Example 6 includes, identifying that the entity performed the further revised resource allocation optimization; and responsive to identifying that the entity performed the further revised resource allocation optimization, updating the set of rules based upon the further revised resource allocation optimization such that the updated set of rules de-emphasizes providing the original resource allocation optimization in favor of the revised resource allocation optimization.

Example 8 is a computing device of a network-based service for resource allocation optimization, the computing device comprising: a hardware processor; a memory, the memory storing instructions, which when executed by the hardware processor, causes the computing device to perform operations comprising: receiving, over a network, from a resource allocation clearinghouse, a resource al location report describing first resource allocation data of an entity and a plurality of resource allocation data stores where the entity is storing resources; obtaining, from the plurality of resource allocation data stores in the resource allocation report, second resource allocation data of the entity; inferring, from the first and second resource allocation data of the entity and a set of rules, a resource allocation goal; determining a resource allocation optimization to achieve the resource allocation goal, the resource allocation optimization determined using the first and second resource allocation data of the entity, the resource allocation goal, and the set of rules; presenting the resource allocation optimization through a Graphical User Interface (GUI), the GUI including portions of the first and second resource allocation data from the plurality of resource allocation data stores; receiving feedback from the entity through the GUI that the resource allocation goal is incorrect; receiving an updated goal from the entity; revising the resource allocation optimization using the first and second resource al location data of the entity, the set of rules, and the updated goal; presenting the revised resource allocation optimization through the GUI; and updating the set of rules based upon the first and second resource allocation data of the entity, the resource allocation goal, and the revised resource allocation goal.

In Example 9, the subject matter of Example 8 includes, wherein the operations further comprise: receiving health score data of the entity; identifying that the health score data of the entity meets a specified criterion; and responsive to identifying that the health score data of the entity meets the specified criterion, changing a term of a resource allocation loan.

In Example 10, the subject matter of Example 9 includes, wherein the operations of changing the term of the resource allocation loan comprises reducing a resource charge for the resource allocation loan.

In Example 11, the subject matter of Examples 9-10 includes, wherein the health score data is a trend over a prespecified period of time.

In Example 12, the subject matter of Examples 8-11 includes, wherein the resource allocation goal comprises a short term, medium term, and long term goal.

In Example 13, the subject matter of Examples 8-12 includes, wherein the operations further comprise: identifying that the entity did not implement the resource allocation optimization; responsive to identifying that the entity did not implement the resource allocation optimization, further revising the resource allocation optimization using the first and second resource allocation data of the entity, the set of rules, and the updated goal; and presenting the further revised resource al location optimization in the GUI.

In Example 14, the subject matter of Example 13 includes, identifying that the entity performed the further revised resource allocation optimization; and responsive to identifying that the entity performed the further revised resource allocation optimization, updating the set of rules based upon the further revised resource allocation optimization such that the updated set of rules de-emphasizes providing the original resource allocation optimization in favor of the revised resource allocation optimization.

Example 15 is a non-transitory, machine-readable medium, storing instructions for a network-based service for resource allocation optimization, the instructions, when executed by a computing device of the network-based service, cause the computing device to perform operations comprising: receiving, over a network, from a resource allocation clearinghouse, a resource allocation report describing first resource allocation data of an entity and a plurality of resource allocation data stores where the entity is storing resources; obtaining, from the plurality of resource allocation data stores in the resource allocation report, second resource allocation data of the entity; inferring, from the first and second resource allocation data of the entity and a set of rules, a resource allocation goal; determining a resource allocation optimization to achieve the resource allocation goal, the resource allocation optimization determined using the first and second resource allocation data of the entity, the resource allocation goal, and the set of rules; presenting the resource allocation optimization through a Graphical User Interface (GUI), the GUI including portions of the first and second resource allocation data from the plurality of resource allocation data stores; receiving feedback from the entity through the GUI that the resource allocation goal is incorrect; receiving an updated goal from the entity; revising the resource allocation optimization using the first and second resource allocation data of the entity, the set of rules, and the updated goal; presenting the revised resource allocation optimization through the GUI; and updating the set of rules based upon the first and second resource allocation data of the entity, the resource allocation goal, and the revised resource allocation goal.

In Example 16, the subject matter of Example 15 includes, wherein the operations further comprise: receiving health score data of the entity; identifying that the health score data of the entity meets a specified criterion; and responsive to identifying that the health score data of the entity meets the specified criterion, changing a term of a resource allocation loan.

In Example 17, the subject matter of Example 16 includes, wherein the operations of changing the term of the resource allocation loan comprises reducing a resource charge for the resource allocation loan.

In Example 18, the subject matter of Examples 16-17 includes, wherein the health score data is a trend over a prespecified period of time.

In Example 19, the subject matter of Examples 16-18 includes, wherein the resource allocation goal comprises a short term, medium term, and long term goal.

In Example 20, the subject matter of Examples 16-19 includes, wherein the operations further comprise: identifying that the entity did not implement the resource allocation optimization; responsive to identifying that the entity did not implement the resource allocation optimization, further revising the resource allocation optimization using the first and second resource allocation data of the entity, the set of rules, and the updated goal; and presenting the further revised resource allocation optimization in the GUI.

In Example 21, the subject matter of Example 20 includes, identifying that the entity performed the further revised resource allocation optimization; and responsive to identifying that the entity performed the further revised resource allocation optimization, updating the set of rules based upon the further revised resource allocation optimization such that the updated set of rules de-emphasizes providing the original resource allocation optimization in favor of the revised resource allocation optimization.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for resource allocation optimization, the method comprising:
using one or more hardware processors of a network-based service:
receiving, over a network, from a resource allocation clearinghouse, a resource allocation report describing first resource allocation data of an entity and a plurality of resource allocation data stores where the entity is storing resources;

obtaining, from the plurality of resource al location data stores in the resource allocation report, second resource allocation data of the entity;

inferring, from the first and second resource allocation data of the entity and a set of rules, a resource allocation goal;

determining a resource allocation optimization to achieve the resource allocation goal, the resource allocation optimization determined using the first and second resource allocation data of the entity, the resource allocation goal, and the set of rules;

presenting the resource allocation optimization through a Graphical User Interface (GUI), the GUI including portions of the first and second resource allocation data from the plurality of resource allocation data stores;

receiving feedback from the entity through the GUI that the resource allocation goal is incorrect;

receiving an updated goal from the entity;

revising the resource allocation optimization using the first and second resource allocation data of the entity, the set of rules, and the updated goal;

presenting the revised resource allocation optimization through the GUI; and updating the set of rules based upon the first and second resource allocation data of the entity, the resource allocation goal, and the revised resource allocation goal.

2. The method of claim 1, further comprising:
receiving health score data of the entity;
identifying that the health score data of the entity meets a specified criterion; and
responsive to identifying that the health score data of the entity meets the specified criterion, changing a term of a resource allocation loan.

3. The method of claim 2, wherein changing the term of the resource allocation loan comprises reducing a resource charge for the resource allocation loan.

4. The method of claim 2, wherein the health score data is a trend over a prespecified period of time.

5. The method of claim 1, wherein the resource allocation goal comprises a short er medium term, and long term goal.

6. The method of claim 1, further comprising:
identifying that the entity did not implement the resource allocation optimization;
responsive to identifying that the entity did not implement the resource allocation optimization, further revising the resource al location optimization using the first and second resource allocation data of the entity, the set of rules, and the updated goal; and
presenting the further revised resource al location optimization in the GUI.

7. The method of claim 6, further comprising:
identifying that the entity performed the further revised resource allocation optimization; and
responsive to identifying that the entity performed the further revised resource al location optimization, updating the set of rules based upon the further revised resource allocation optimization such that the updated set of rules de-emphasizes providing the original resource allocation optimization in favor of the revised resource allocation optimization.

8. A computing device of a network-based service for resource allocation optimization, the computing device comprising:
a hardware processor;
a memory, the memory storing instructions, which when executed by the hardware processor, causes the computing device to perform operations comprising:
receiving, over a network, from a resource allocation clearinghouse, a resource allocation report describing first resource allocation data of an entity and a plurality of resource allocation data stores where the entity is storing resources;
obtaining, from the plurality of resource allocation data stores in the resource allocation report, second resource allocation data of the entity;
inferring, from the first and second resource allocation data of the entity and a set of rules, a resource allocation goal;
determining a resource allocation optimization to achieve the resource allocation goal, the resource allocation optimization determined using the first and second resource allocation data of the entity, the resource allocation goal, and the set of rules;
presenting the resource allocation optimization through a Graphical User Interface (GUI), the GUI including portions of the first and second resource allocation data from the plurality of resource allocation data stores;
receiving feedback from the entity through the GUI that the resource allocation goal is incorrect;
receiving an updated goal from the entity;
revising the resource allocation optimization using the first and second resource allocation data of the entity, the set of rules, and the updated goal;
presenting the revised resource allocation optimization through the GUI; and
updating the set of rules based upon the first and second resource allocation data of the entity, the resource allocation goal, and the revised resource allocation goal.

9. The computing device of claim 8, wherein the operations further comprise:
receiving health score data of the entity;
identifying that the health score data of the entity meets a specified criterion; and
responsive to identifying that the health score data of the entity meets the specified criterion, changing a term of a resource allocation loan.

10. The computing device of claim 9, wherein the operations of changing the term of the resource allocation loan comprises reducing a resource charge for the resource allocation loan.

11. The computing device of claim 9, wherein the health score data is a trend over a prespecified period of time.

12. The computing device of claim 8, wherein the resource allocation goal comprises a short term, medium term, and long term goal.

13. The computing device of claim 8, wherein the operations further comprise:
identifying that the entity did not implement the resource allocation optimization;
responsive to identifying that the entity did not implement the resource allocation optimization, further revising the resource allocation optimization using the first and second resource allocation data of the entity, the set of rules, and the updated goal; and presenting the further revised resource allocation optimization in the GUI.

14. The method of claim 13, further comprising:
identifying that the entity performed the further revised resource allocation optimization; and
responsive to identifying that the entity performed the further revised resource allocation optimization, updating the set of rules based upon the further revised resource allocation optimization such that the updated set of rules de-emphasizes providing the original resource allocation optimization in favor of the revised resource allocation optimization.

15. A non-transitory, machine-readable medium, storing instructions for a network-based service for resource allocation optimization, the instructions, when executed by a computing device of the network-based service, cause the computing device to perform operations comprising:
receiving, over a network; from a resource allocation clearinghouse, a resource allocation report describing first resource allocation data of an entity and a plurality of resource allocation data stores where the entity is storing resources;
obtaining, from the plurality of resource al location data stores in the resource allocation report, second resource allocation data of the entity;
inferring, from the first and second resource allocation data of the entity and a set of rules, a resource allocation goal;
determining a resource allocation optimization to achieve the resource allocation goal, the resource allocation optimization determined using the first and second resource allocation data of the entity, the resource allocation goal, and the set of rules;
presenting the resource allocation optimization through a Graphical User Interface (GUI), the GUI including portions of the first and second resource allocation data from the plurality of resource allocation data stores;
receiving feedback from the entity through the GUI that the resource allocation goal is incorrect;
receiving an updated goal from the entity;
revising the resource allocation optimization using the first and second resource allocation data of the entity, the set of rules, and the updated goal;
presenting the revised resource allocation optimization through the GUI; and
updating the set of rules based upon the first and second resource al location data of the entity, the resource allocation goal, and the revised resource allocation goal.

16. The non-transitory, machine-readable medium of claim 15, wherein the operations further comprise:
receiving health score data of the entity;
identifying that the health score data of the entity meets a specified criterion; and
responsive to identifying that the health score data of the entity meets the specified criterion, changing a term of a resource allocation loan.

17. The non-transitory, machine-readable medium of claim 16, wherein the operations of changing the term of the resource allocation loan comprises reducing a resource charge for the resource allocation loan.

18. The non-transitory, machine-readable medium of claim 16, wherein the health score data is a trend over a prespecified period of time.

19. The non-transitory, machine-readable medium of claim 16, wherein the resource allocation goal comprises a short term, medium term, and long term goal.

20. The non-transitory, machine-readable medium of claim 16, wherein the operations further comprise:
identifying that the entity did not implement the resource allocation optimization;
responsive to identifying that the entity did not implement the resource allocation optimization, further revising the resource allocation optimization using the first and second resource allocation data of the entity, the set of rules, and the updated goal; and
presenting the further revised resource allocation optimization in the GUI.

\* \* \* \* \*